(12) United States Patent
Tang et al.

(10) Patent No.: US 11,449,076 B2
(45) Date of Patent: Sep. 20, 2022

(54) METHOD FOR CONTROLLING PALM LANDING OF UNMANNED AERIAL VEHICLE, CONTROL DEVICE, AND UNMANNED AERIAL VEHICLE

(71) Applicant: SZ DJI TECHNOLOGY CO., LTD., Shenzhen (CN)

(72) Inventors: Ketan Tang, Shenzhen (CN); Zhaoliang Peng, Shenzhen (CN); You Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 397 days.

(21) Appl. No.: 16/664,803

(22) Filed: Oct. 26, 2019

(65) Prior Publication Data

US 2020/0133310 A1 Apr. 30, 2020

Related U.S. Application Data

(63) Continuation of application No. PCT/CN2017/082393, filed on Apr. 28, 2017.

(51) Int. Cl.
| | |
|---|---|
| *G05D 1/04* | (2006.01) |
| *G06T 7/50* | (2017.01) |
| *B64C 39/02* | (2006.01) |
| *B64D 47/08* | (2006.01) |

(52) U.S. Cl.
CPC ........... *G05D 1/042* (2013.01); *B64C 39/024* (2013.01); *B64D 47/08* (2013.01); *G06T 7/50* (2017.01); *B64C 2201/027* (2013.01); *B64C 2201/127* (2013.01); *B64C 2201/146* (2013.01); *B64C 2201/18* (2013.01);
(Continued)

(58) Field of Classification Search
CPC ...... G05D 1/042; G05D 1/0684; G05D 1/104; B64C 39/024; B64C 2201/027; B64C 2201/127; B64C 2201/146; B64C 2201/18; B64C 2201/024; B64D 47/08; G06T 7/50; G06T 2207/10024; G06T 2207/10028; G06T 2207/30196; G06T 2207/10032; G06T 2207/30252; G06T 7/73

See application file for complete search history.

(56) References Cited

U.S. PATENT DOCUMENTS

| | | | | |
|---|---|---|---|---|
| 2006/0249622 A1* | 11/2006 | Steele | ........................ | B64F 1/02 244/115 |
| 2017/0177004 A1* | 6/2017 | Wang | .................... | G05D 1/0808 |
| 2017/0336804 A1* | 11/2017 | Yang | .................... | G05D 1/0676 |

FOREIGN PATENT DOCUMENTS

| | | |
|---|---|---|
| CN | 102467657 A | 5/2012 |
| CN | 102779359 A | 11/2012 |
| CN | 102831378 A | 12/2012 |

(Continued)

OTHER PUBLICATIONS

The World Intellectual Property Organization (WIPO) International Search Report for PCT/CN2017/082393 dated Jan. 25, 2018 6 pages.

*Primary Examiner* — Richard M Camby
(74) *Attorney, Agent, or Firm* — Anova Law Group, PLLC

(57) ABSTRACT

A method for controlling palm landing of an unmanned aerial vehicle ("UAV") includes detecting a flight status of the UAV under a predetermined condition. The method also includes controlling the UAV to land on a palm of a user when the flight status is a hover state and when the palm is located under the UAV.

20 Claims, 6 Drawing Sheets

(52) U.S. Cl.
CPC ............... *G06T 2207/10024* (2013.01); *G06T 2207/10028* (2013.01); *G06T 2207/30196* (2013.01)

(56) References Cited

FOREIGN PATENT DOCUMENTS

| | | | |
|---|---|---|---|
| CN | 104991561 | A | 10/2015 |
| CN | 105068548 | A | 11/2015 |
| CN | 105182994 | A | 12/2015 |
| CN | 105204349 | A | 12/2015 |
| CN | 204903983 | U | 12/2015 |
| CN | 105487550 | A | 4/2016 |
| CN | 105867405 | A | 8/2016 |
| CN | 106444824 | A | 2/2017 |
| WO | 2012102698 | A1 | 8/2012 |
| WO | 2014007705 | A1 | 1/2014 |

* cited by examiner

METHOD FOR CONTROLLING PALM LANDING OF UNMANNED AERIAL VEHICLE, CONTROL DEVICE, AND UNMANNED AERIAL VEHICLE

CROSS-REFERENCE TO RELATED APPLICATION

This application is a continuation application of International Application No. PCT/CN2017/082393, filed on Apr. 28, 2017, the entire content of which is incorporated herein by reference.

TECHNICAL FIELD

The present disclosure relates to the technology field of unmanned aerial vehicles and, more particularly, to a method for controlling palm landing of an unmanned aerial vehicle ("UAV"), a control device, and a UAV.

BACKGROUND

As the advancement of the science and technology, unmanned aerial vehicle ("UAV") has increasingly rich functions. The application fields of the UAV are also continuingly expanding, including professional aerial photographing, survey, rescue, agriculture, etc.

When a UAV needs to land after completing a task or when the battery is low, the current landing method is to control the UAV to land a flat ground surface away from a user at a distance. However, this landing method brings inconvenience to the user: first, the UAV needs to land on a relatively flat ground surface. When the UAV needs to land, in some conditions, e.g., when the user is at a sand land, an agriculture field, a mountain, etc., the user may have difficulty to find a flat ground surface to control the UAV to land. This may reduce the landing safety of the UAV. Further, currently, after the UAV is landed, the user needs to go over to pick up the UAV, which increases the operation time for the user. The lack of a safe and convenient landing method may reduce the utility of the UAV in some conditions.

SUMMARY

In accordance with an aspect of the present disclosure, there is provided a method for controlling palm landing of an unmanned aerial vehicle ("UAV"). The method includes detecting a flight status of the UAV under a predetermined condition. The method also includes controlling the UAV to land on a palm of a user when the flight status is a hover state and when the palm is located under the UAV.

In accordance with another aspect of the present disclosure, there is provided a device for controlling palm landing of an unmanned aerial vehicle ("UAV"). The device includes a storage device configured to store program instructions. The device also includes a processor configured to execute the program instructions stored in the storage device. When the program instructions are executed, the processor is configured to detect a flight status of the UAV under a predetermined condition, and control the UAV to land on a palm of a user when the flight status is a hover state and when the palm is located under the UAV.

According to the technical solution of the method for controlling the palm landing of the UAV, the control device, and the UAV, under a predetermined condition, the flight status of the UAV may be detected. When the flight status is a hover state and the palm is located under the UAV, the UAV may be controlled to land on the palm of the user. The disclosed method may effectively reduce the requirement on the landing conditions for the UAV in the current technology. In the meantime, the disclosed method reduces the time for the user to recover the UAV, and increases the convenience of the UAV landing.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
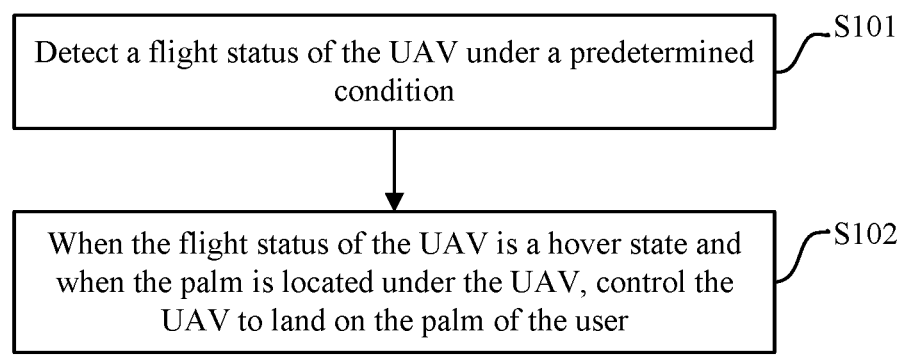
FIG. 1 is a flow chart illustrating a method for controlling palm landing of a UAV, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "module" as used herein includes hardware components or devices, such as circuit, housing, sensor, connector, etc. The term "communicatively couple (d)" or "communicatively connect(ed)" indicates that related items are coupled or connected through a communication channel, such as a wired or wireless communication channel. The term "unit" or "module" may encompass a hardware component, a software component, or a combination thereof. For example, a "unit" or "module" may include a processor, a portion of a processor, an algorithm, a portion of an algorithm, a circuit, a portion of a circuit, etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The present disclosure provides a method for controlling palm landing of a UAV. FIG. 1 is a flow chart illustrating the method for controlling the palm landing. As shown in FIG. 1, the method may include:

Step S101: detecting a flight status of the UAV under a predetermined condition.

Figure 2:
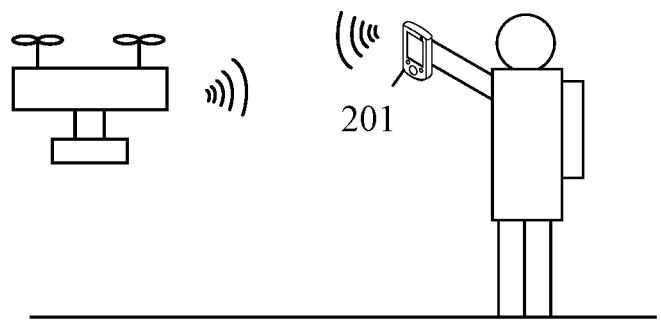
FIG. 2 is a schematic illustration of detecting a flight status of the UAV after receiving a palm landing command transmitted by a control terminal, according to an example embodiment.

In some embodiments, when the UAV is prepared to land, the flight status may be detected. Various methods may be used to trigger the detection of the flight status of the UAV:

In one practical method: as shown in FIG. 2, when receiving a palm landing command transmitted by a control terminal 201, the flight status of the UAV may be detected. For example, when the UAV needs to land, a user may send, through the control terminal 201, a command to the UAV to instruct the UAV to enter a landing mode. After receiving the command, a sensing system of the UAV may acquire data, and a flight control system of the UAV may detect the flight status of the UAV based on the acquired data. In some embodiments, the control terminal may include one or more of a remote controller, a smart cell phone, a tablet, a laptop, a ground control station, and a wearable device (e.g., a watch, a wrist band).

In another practical method: image data output by a second imaging sensor may be obtained. When it is determined that a user is detected based on the image data output by the second imaging sensor, the flight status of the UAV may be detected. In some embodiments, the UAV may be provided with a second imaging sensor 301. The second imaging sensor 301 may be mounted at a head of the UAV, or may be mounted to a gimbal of the UAV. In the following descriptions, as an illustrative example, the second imaging sensor 301 is mounted to the head of the UAV. The second imaging sensor 301 may be configured to acquire image data in real time from a flight space. When the user is located within a data acquisition range of the second imaging sensor 301, the second imaging sensor 301 may obtain image data that includes user information. A processor of the UAV may obtain the image data that includes the user information, and detect the user based on the image data, such as determining that the user is located in front of the UAV. When the user is detected, the UAV may start detecting the flight status.

Figure 3:
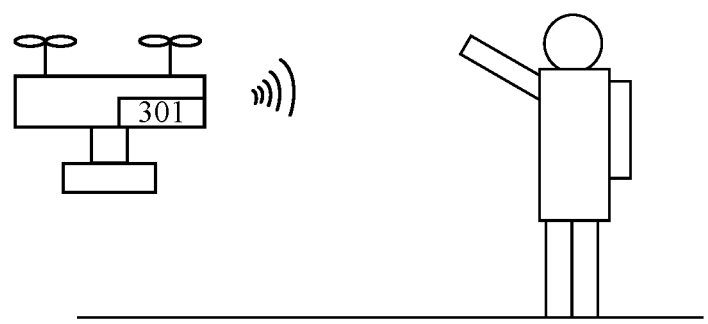
FIG. 3 is a schematic illustration of user detection and distance determination based on image data output by a second imaging sensor, according to an example embodiment.

In some embodiments, when it is determined that the user has been detected based on the image data output by the second imaging sensor 301, detecting the flight status of the UAV may include: when it is determined that the user has been detected based o the image data output by the second imaging sensor 301, and when a distance between the user and the UAV is smaller than or equal to a predetermined distance, detecting the flight status of the UAV. As shown in FIG. 3, when it is determined that the user has been detected based on the image data, e.g., when determining that the user is located in front of the UAV, a distance between the user and the UAV may be detected. When the distance between the user and the UAV is smaller than or equal to the predetermined distance, the UAV may detect the flight status. In some embodiments, the distance between the user and the UAV may be determined based on the image data, or other methods may be used. When it is detected that the user is located in front of the UAV, and the distance between the user and the UAV is smaller than or equal to the predetermined distance, the UAV may start detecting the flight status.

The method of determining that the user has been detected and/or determining the distance between the user and the UAV based on the image data output by the second imaging sensor will be described in detail later.

In some embodiments, the flight status of the UAV may include: a UAV parked on ground state, hover state, moving state. The moving state may further include: a descending state, ascending state, horizontal flight state, etc.

Step S102: when the flight status of the UAV is a hover state and when the palm is located under the UAV, controlling the UAV to land on the palm of the user.

In some embodiments, the flight status of the UAV may be detected. When it is determined that the flight status of the UAV is a hover state, the user may go to the front of the UAV, and may extend a palm of the user under the UAV. The method shown in FIG. 1 may also include: determining that the palm is located under the UAV. In some embodiments, the UAV may use a sensor located at a bottom of the UAV to detect whether the pam of the user is located under the UAV. When it is determined that the palm is under the UAV, i.e., when determining that the user has extended the palm under the UAV, a propulsion system of the UAV may be controlled, e.g., a rotation speed of a driving motor of the UAV may be reduced, to control the UAV to slowly land on the palm of the user. As such, after the UAV stops the blades, the user recovers the UAV.

In some embodiments, in the method for controlling the palm landing of the UAV, the flight status of the UAV may be detected under a predetermined condition. When the flight status is a hover state and when the palm is under the UAV, the UAV may be controlled to land on the palm of the user. The disclosed method may effectively reduce the requirement on the UAV landing condition in the current technology. In the meantime, the time for recovering the UAV may be reduced, and the convenience of UAV landing may be enhanced.

In some embodiments, detecting the flight status of the UAV may include: detecting the flight status of the UAV based on one or more of a velocity, an acceleration, a relative altitude, and an angular velocity of the body of the UAV, a control amount output by the control terminal, and a propulsion output, all of which may be obtained by a sending system of the UAV. In some embodiments, the flight control system of the UAV may include a flight status device configured to detect the flight status of the UAV. The flight status device may acquire data obtained by the sensing system of the UAV, such as one or more of the velocity, acceleration, relative altitude, angular velocity of the body of the UAV, control amount output by the control terminal, and propulsion output, and may detect the flight status of the UAV based on such data.

In some embodiments, when the UAV obtains the image data, the types of the second imaging sensors may be different. Next, the method of detecting the user and/or determining the distance between the user and the UAV based on the image data will be described in detail. Detecting the user based on the image data may be carried out based on one or more of the following practical methods:

One practical method: when the second imaging sensor 301 is a red-green-blue ("RGB") camera, the image data may be RGB image data. The RGB camera may be any camera that can obtain the RGB images. In some embodiments, the RGB images obtained by the RGB camera may be down-sampled based on a preset resolution, e.g., 320*240 or 720*360. Then the down-sampled images may be input into a neuro-network that has been trained offline. The neuro-network may output a location of the user in the image(s), a bounding box, and a confidence value. When the confidence value is greater than or equal to a predetermined value, e.g., when the confidence value is greater than or equal to 0.8, it may be determined that the image data include user information, i.e., it may be determined that the user has been detected.

In some embodiments, the distance between the user and the UAV may be determined based on the RGB images. As described above, the neuro-network may output a bounding box. The bounding box may enclose the user. When the confidence value is greater than or equal to the predetermined value, it may be determined that the user has been detected. The distance between the user and the UAV may be determined based on the size of the bounding box and parameters of the camera. The parameters of the camera may include one of an internal parameter or an external parameter of the camera.

Another practical method: when the second imaging sensor 301 is a time of flight ("TOF") camera, the image data are depth image data. Because the functional distance of the TOF camera is short (a general effective distance is smaller than 5 m), and the resolution is relatively low (e.g., only 80×60, i.e., the width and height of the image is w=80, h=60), when using the TOF camera to detect the user, the distance needs to be relatively close (or small) (generally within 3 m). Next, detecting the user and/or determining the distance between the user and the UAV based on the depth image data will be described in detail:

In some embodiments, the method may include determining points within a predetermined range in the current frame of depth image, determining at least one connected region of the points within the predetermined range, and detecting the user and/or determining the distance between the user and the UAV based on the at least one connected region. In some embodiments, during detection, first, a location of the user $\hat{x}_b$, $\hat{y}_b$ in the depth data of the current frame and an estimated depth $\hat{z}_b$ may be estimated. Points within the predetermined range may be determined based on the estimated location $\hat{x}_b$, $\hat{y}_b$ of the user in the current frame and the estimated depth $\hat{z}_b$. A cloud (or set) of the points within the predetermined range may be expressed as $x_b \in [\max(0, \hat{x}_b -20), \min(w, \hat{x}_b +20))$, $y_b \in [\max(0, \hat{y}_b -20), \min(h, \hat{y}_b +20))$, $d_b \in [\max(0.5, \hat{z}_b -0.5), \min(5, \hat{z}_b +0.5))$. The above predetermined range is only illustrative. A person having ordinary skills in the art can determine other predetermined ranges based on the estimated location $\hat{x}_b$, $\hat{y}_b$ and the estimated depth $\hat{z}_b$. After determining the points in the predetermined range, the at least one connected region of the points may be determined based on a suitable algorithm, such as a flood fill algorithm. After obtaining the at least one connected region, determination of detection of the user and determination of the distance between the user and the UAV may be carried out based on the at least one connected region.

In some embodiments, determining the points within the predetermined range in the current frame of depth image may include: determining the points within the predetermined range in the current frame of depth image based on a previous frame of depth image. In some embodiments, the location of the user $\hat{x}_b$, $\hat{y}_b$ in the current frame may be estimated and the depth $\hat{z}_b$ may be estimated based on the previous frame of depth image. The TOF camera may obtain multiple frames of depth images based on a fixed frame rate. When the user is detected in the previous frame, the location of the user in the current frame may be set to be the same as that in the previous frame, i.e., the estimated location of the body of the user in the current frame is $\hat{x}_b$ $\hat{y}_b$ and the estimated depth is $\hat{z}_b$. If the body of the user is not detected in the previous frame, but a hand of the user is detected, then the estimated location of the user in the current frame may be the same as the location of the detected hand in the previous frame. The estimated depth of the user in the current frame may be a sum of the depth of the hand detected in the previous frame and the length of the arm. If the user is not detected in the previous frame or if the current frame is a first frame of image data, then the estimated location of the user in the current frame is at the center of the image. The estimated depth of the body of the user in the current frame may be set as a predetermined value, such as 1-3 m. For example, in some embodiments, the predetermined value may be 1.3 m, 1.5 m, 1.7 m, etc.

In some embodiments, determining that the user has been detected and/or determining the distance between the user and the UAV based on the at least one connected region may include: determining a connected region having the largest area among the at least one connected region, and determining that the user has been detected and/or determining the distance between the user and the UAV based on the connected region having the largest area. In some embodiments, when determining the at least one connected region of the points located within the predetermined region using the flood fill algorithm, multiple connected regions may be determined. A connected region having the largest area may be selected from the multiple connected regions to determine detection of the user and/or determine the distance between the user and the UAV.

In some embodiments, determining detection of the user based on the at least one connected region may include: normalizing a shape characteristic of the at least one connected region based on an average depth or a median depth of the at least one connected region, and determining detection of the user based on the normalized shape characteristic of the at least one connected region. In some embodiments, after obtaining the at least one connected region, the shape characteristic of the at least one connected region may be determined. The shape characteristic of the at least one connected region may include at least one of a length, a width, or an area of the at least one connected region. When the distances of users and UAVs are different, the sizes of the users in the images may be different. Thus, it may be desirable to eliminate the effect of the distance. The shape characteristic of the at least one connected region may be normalized based on the average depth or the median depth of the at least one connected region. For example, the average depth or the median depth of the at least one connected region may be multiplied by the shape characteristic of the at least one connected region to obtain a normalized shape characteristic of the at least one connected region. The normalized shape characteristic of the at least one connected region may be input into already trained classifier, which may output an indicator indicating whether the user is detected, i.e., the classifier may determine whether the user is detected. The classifier may be any suitable classifier, such as a decision tree, a support vector machine, a naïve Bayesian, etc.

In some embodiments, determining the distance between the user and the UAV may include: when determining detection of the user, determining the distance between the user and the UAV based on the average depth or median depth of the at least one connected region. In some embodiments, when following the above-described method, when determining detection of the user based on the at least one connected region, the distance between the user and the UAV may be the average depth or the median depth of the at least one connected region.

In some embodiments, when the indicator output by the classifier for detecting the user indicates that a user has not been detected, the normalized shape characteristic of the at least one connected region may be input into the already trained classifier configured to detect the palm. The classifier configured to detect the palm may output an indicator indicating whether the palm is detected.

In some embodiments, other practical methods may be used to determine whether the palm has been detected. For example, one or multiple points in the depth image having the smallest depth may be determined. A point indicating a palm from the one or multiple points may be determined. The point may indicate a finger point of a user. In a predetermined depth range, all points connected with the point indicating the palm may be retrieved. The flood fill algorithm may be used to obtain all of the points that are connected, i.e., obtain the connected region. The connected region may be configured to indicate the hand portion. However, the hand portion includes the palm and the arm. Accordingly, points in the connected region indicating the arm may be removed to obtain the connected region indicating the palm. The above-described normalization process may be applied to the connected region indicating the palm. The processed shape characteristic of the connected region may be used to determine whether the palm is detected.

Figure 4:
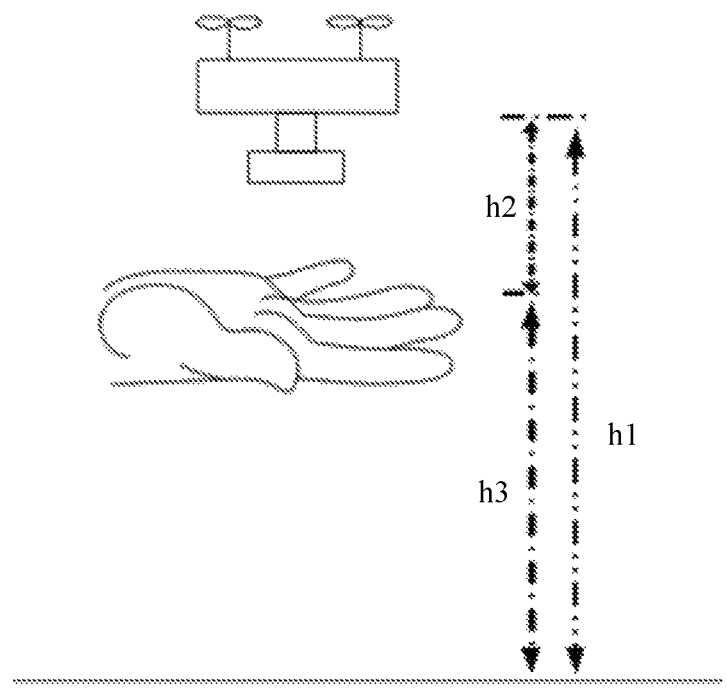
FIG. 4 is a schematic illustration of determining that a palm is located under the UAV based through a distance sensor, according to an example embodiment.

In some embodiments, one or more of the following practical methods may be used to determine that the palm of the user is located under the UAV:

One practical method: a relative distance measured by a distance sensor may be obtained. The relative distance may be a distance of the UAV relative to a reference point under the UAV. It may be determined that the palm is located under the UAV based on the distance. As shown in FIG. 4, the distance sensor may be provided at a bottom of the UAV. The distance sensor may be any suitable sensor that can measure distance information, such as an ultrasound sensor, a single point TOF sensor, a monocular camera, a binocular camera, a TOF camera, etc. When the UAV is hovering, when the user has not yet extended the palm to be under the UAV, the distance measured by the distance sensor is the distance from the UAV to the ground, i.e., the reference point is the ground under the UAV. This measured distance is h1. When the user extends the palm to be under the UAV, the distance measured by the distance sensor is the distance from the UAV to the palm of the user, i.e., the reference point is the palm under the UAV. This measured distance is h2. As such, before and after the user extends the palm to be under the UAV, the relative distance measured by the distance sensor is changed. Accordingly, it may be determined that the palm is located under the UAV based on the change in the distance.

In some embodiments, when the change in the relative distance satisfies a predetermined condition, it may be determined that the palm is located under the UAV. For example, the change in the distance may be h3 (i.e., h1−h2), and the predetermined condition may be: the change in the distance is greater than or equal to a predetermined distance value. For example, when the predetermined distance value is set as 0.5 m, and when the change in the relative distance h3 is greater than or equal to 0.5 m, it may be determined that the user has extended the palm to be under the UAV. The change in the distance measured by the distance sensor is caused by the user extending the palm. Thus, the UAV may be controlled to land on the palm of the user.

Another practical method: image data of a location under the UAV acquired by a first imaging sensor may be obtained. It may be determined whether the palm is located under the UAV based on the image data. In some embodiments, the first imaging sensor may be mounted to the bottom of the UAV. The first imaging sensor may be any suitable sensor that can obtain image information, such as an RGB camera, a monocular camera, a binocular camera, a TOF camera, etc. The image information may include an RGB image, a gray scale image, a depth image, etc. In some embodiments, the first imaging sensor and the second imaging sensor may be the same or different devices. When the user has not extended the palm to be under the UAV, the image data obtained by the imaging sensor may not include the palm information of the user. When the user extends the palm to be under the UAV, the image data obtained by the imaging sensor may include the palm information of the user. Therefore, whether the palm has been extended to be under the UAV may be determined based on the image data. For example, the image data may be input into the neuro-network model that has already been trained offline. The neuro-network model may output a confidence value, a location of the palm in the image. When the confidence value is greater than a predetermined value (e.g., 0.8), it may be determined that the palm of the user exists under the UAV. Then, the UAV may be controlled to land on the palm of the user.

In some embodiments, determining whether the palm is located under the UAV based on the image data may include: determining that the palm is located under the UAV based on the image data and a change in the distance of the UAV relative to a reference point under the UAV. For example, after determining that the image data includes the palm information of the user, it may be further determined whether the change in the distance caused by the user extending the palm toward a location under the UAV satisfies the above-described predetermined condition. When the predetermined condition is satisfied by the change in the distance, it may be determined that the palm of the users exists under the UAV, and the UAV may be controlled to land on the palm of the user. The distance may be determined based on the above-described distance sensor. In some embodiments, when the image obtained by the first imaging sensor is a depth image, the distance may be determined based on the depth image obtained by the first imaging sensor.

Figure 5:
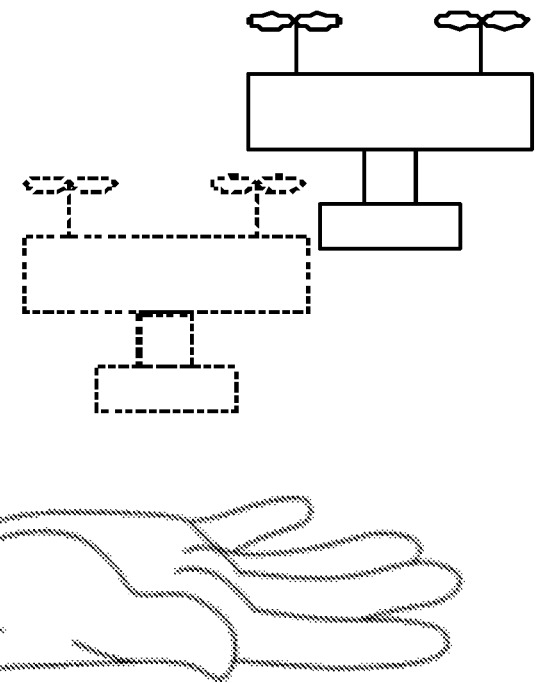
FIG. 5 is a schematic illustration of controlling the UAV to land on the palm based on the location of the palm, according to an example embodiment.

In some embodiments, controlling the UAV to land on the palm of the user may include: determining a location of the palm, and controlling the UAV to land on the palm based on the location. For example, as shown in FIG. 5, when the UAV detects that the palm of the user has been extended to be under the UAV, the palm of the user may not be right under the UAV. Then the UAV may land at an outer periphery of the palm, which is inconvenient for the user to grab the UAV. As a result, the UAV may fall off from the palm, or the blades of the UAV may cause injury to the palm of the user. The UAV may use the sensor provided at the bottom of the UAV to determine the location of the palm relative to the UAV. The UAV may adjust the landing direction based on the location information of the palm, such that the UAV may land at the center of the palm of the user. This method may improve the safety of the landing, and may make it convenient for the user to grab the UAV.

In some embodiments, the UAV may obtain image data of a location under the UAV through a third imaging sensor, and may determine a location of the palm in the image based on the image data. The third imaging sensor may be provided at the bottom of the UAV. In some embodiments, the distance sensor provided at the bottom of the UAV may determine a relative distance between the palm and the UAV. The UAV may determine a location of the palm based on the location of the palm in the image and the relative distance. In some embodiments, when the third imaging sensor provided at the bottom of the UAV can obtain a depth image of the location under the UAV, the UAV may determine a location of the palm based on the depth image. In some embodiments, the third imaging sensor and the first imaging sensor may be the same or may be different. The third imaging sensor and the second imaging sensor may be the same or may be different.

In some embodiments, controlling the UAV to land on the palm of the user may include: determining a landing velocity based on a relative distance between the UAV and the palm, and controlling the UAV to land on the palm of the user based on the landing velocity. In some embodiments, after determining that the palm of the user exists under the UAV, the UAV may start landing. During the landing process, the distance sensor provided at the bottom of the UAV may measure the relative distance between the UAV and the user in real time. After obtaining the relative distance, the UAV may control the rotation speed of the motor based on the relative distance. The UAV may determine a landing velocity of the UAV based on a closed-loop control strategy. When the relative distance is large, the landing velocity may be fast. When the relative distance is small, the landing velocity may be slow. As such, the landing safety of the UAV may be maintained.

Figure 6:
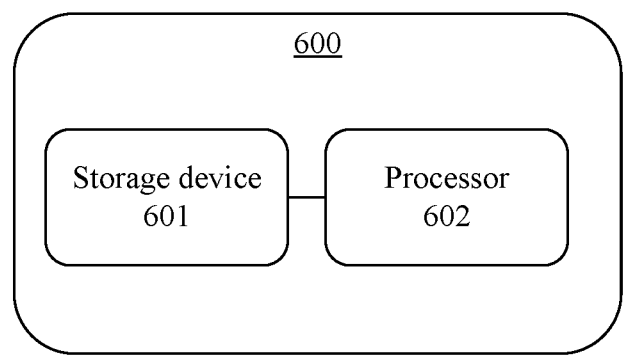
FIG. 6 is a schematic diagram of the structure of a control device for controlling the palm landing of the UAV, according to an example embodiment.

The present disclosure provides a control device for controlling the palm landing of the UAV. FIG. 6 is a schematic diagram of the structure of the control device for controlling the palm landing of the UAV. As shown in FIG. 6, a control device 600 for controlling the palm landing of the UAV may include:

a storage device 601 configured to store program instructions;

a processor 602 configured to execute the program instructions stored in the storage device. When the program instructions are executed, the processor may perform the following operations:

detecting a flight status of the UAV under a predetermined condition; and when the flight status is a hover state and when the palm is located under the UAV, controlling the UAV to land on the palm of the user.

In some embodiments, when the UAV is ready to land, the processor 602 may detect the flight status of the UAV. One or more of the following practical methods may be set to trigger detection of the flight status of the UAV:

One practical method: detecting, by the processor 602, the flight status when receiving a palm landing command transmitted by a control terminal (or in response to receiving a palm landing command transmitted by a control terminal).

In some embodiments, the control terminal may include one or more of a remote controller, a smart cell phone, a tablet, a laptop, a ground control station, and a wearable device (e.g., a watch, a wrist band). In some embodiments, the second imaging sensor may be mounted to a head of the UAV, or mounted to a gimbal of the UAV.

Another practical method: obtaining, by the processor 602, image data output by a second imaging sensor; and detecting the flight status of the UAV when determining that the user has been detected based on the image data output by the second imaging sensor.

In some embodiments, detecting, by the processor 602, the flight status of the UAV when determining that the user has been detected based on the image data output by the second imaging sensor may include:

detecting, by the processor 602, the flight status of the UAV when the processor 602 determines that the user has been detected based on the image data output by the second imaging sensor and when the distance between the user and the UAV is smaller than or equal to a predetermined distance.

In some embodiments, the distance between the user and the UAV may be determined based on image data. Other methods may also be used. When detecting that the user is in front of the UAV, and when the distance between the user and the UAV is smaller than or equal to a predetermined distance, the processor 602 may start detecting the flight status.

In some embodiments, the flight status of the UAV may include: a UAV parked on ground state, hover state, moving state. The moving state may further include: a descending state, ascending state, horizontal flight state, etc.

The control device for controlling the palm landing of the UAV may detect the flight status of the UAV under a predetermined condition. When the flight status is a hover state and when the palm is located under the UAV, the control device may control the UAV to land on the palm of the user. The control device may effectively reduce the requirement on the landing of the UAV in the current technology. In the meantime, the control device may reduce the time for the user to recover the UAV, and improve the convenience of the UAV landing.

In some embodiments, detecting the flight status of the UAV may include: detecting the flight status of the UAV based on one or more of a velocity, an acceleration, a relative altitude, and an angular velocity of the body of the UAV, a control amount output by the control terminal, and a propulsion output, all of which may be obtained by a sending system of the UAV. In some embodiments, the flight control system of the UAV may include a flight status device configured to detect the flight status of the UAV. The flight status device may acquire data obtained by the sensing system of the UAV, such as one or more of the velocity, acceleration, relative altitude, angular velocity of the body of the UAV, control amount output by the control terminal, and propulsion output, and may detect the flight status of the UAV based on such data.

In some embodiments, when the UAV obtains the image data, the types of the second imaging sensors may be different. Next, the method of detecting the user and/or determining the distance between the user and the UAV based on the image data will be described in detail. Detecting the user based on the image data may be carried out based on one or more of the following practical methods:

One practical method: when the second imaging sensor is an RGB camera, the image data may be RGB image data. The processor 602 may be configured to:

when the image data include an RGB image, downsample the RGB image; and determine detection of the user and/or determine a distance between the user and the UAV based on the down-sampled image.

Another practical method: when the second imaging sensor is a TOF camera, the image data may be depth image data. The processor 602 may be configured to:

determine points within a predetermined range in the current frame of depth image, determine at least one connected region of the points within the predetermined range, and determine detection of the user and/or determine the distance between the user and the UAV based on the at least one connected region.

In some embodiments, determining, by the processor 602, points within the predetermined range in the current frame of depth image may include: determining, by the processor 602, points within the predetermined range in the current frame of depth image based on the previous frame of depth image.

In some embodiments, determining, by the processor 602, detection of the user based on the at least one connected region may include:

Normalizing, by the processor 602, a shape characteristic of the at least one connected region based on an average depth or a median depth of the at least one connected region, and determining detection of the user based on the normalized shape characteristic of the at least one connected region.

In some embodiments, the shape characteristic of the at least one connected region may include at least one of a length, a width, or an area of the at least one connected region.

In the above practical methods, determining, by the processor 602, the distance between the user and the UAV may include:

when determining detection of the user, determining, by the processor 602, the distance between the user and the UAV based on the average depth or the median depth of the at least one connected region.

In some embodiments, the processor 602 may be configured to determine that the palm is located under the UAV.

Various methods may be used by the processor 602 to determine that the palm is located under the UAV:

One practical method:

obtaining, by the processor 602, a distance measured by a distance sensor, the distance being a distance of the UAV relative to a reference point under the UAV; and determining that the palm is under the UAV based on the distance.

In some embodiments, determining, by the processor 602, that the palm is located under the UAV based on the distance may include:

determining, by the processor 602, that the palm is located under the UAV based on a change in the distance.

Another practical method:

obtaining, by the processor 602, image data of a location under the UAV acquired by a first imaging sensor, and determining that the palm is located under the UAV based on the image data.

In some embodiments, determining, by the processor 602, that the palm is located under the UAV based on the image data may include:

determining, by the processor 602, that the palm is located under the UAV based on the image data and a change in the distance between the UAV and the reference point under the UAV.

In some embodiments, controlling, by the processor 602, the UAV to land on the palm of the user may include:

determining, by the processor 602, a location of the palm; and controlling the UAV to land on the palm based on the location.

In some embodiments, determining, by the processor 602, the location of the palm may include:

determining, by the processor 602, the location of the palm based on image data of a location under the UAV acquired by a third imaging sensor.

In some embodiments, a landing velocity of the UAV may be controlled. Controlling, by the processor 602, the UAV to land on the palm of the user may include:

determining, by the processor 602, a landing velocity based on a distance of the UAV relative to the palm, and controlling the UAV to land on the palm of the user based on the landing velocity.

The present disclosure also provides a UAV, including:

a body;

a propulsion system fixedly mounted to the body and configured to provide a flight propulsion; and the above-described control device.

In some embodiments, the UAV may also include at least one of a first imaging sensor, a second imaging sensor, a third imaging sensor, or a distance sensor.

In some embodiments, at least one of the first imaging sensor, the second imaging sensor, the third imaging sensor, or the distance sensor may be provided at the bottom of the UAV, the head or the gimbal of the UAV. The first imaging sensor, the second imaging sensor, and the third imaging sensor may be an RGB camera, a TOF camera, a monocular camera, a binocular camera, etc. The distance sensor may include an ultrasonic sensor, a single point TOF sensor, a vision sensor, a radar, or a light detection and ranging ("Lidar") that can obtain distance information.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using indirect coupling or communication between various interfaces, devices, or units. The indirect couplings or communication connections between interfaces, devices, or units may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component. The integrated unit may be realized using hardware or a combination of hardware and software.

The integrated units realized through software functional units may be stored in a non-transitory computer-readable storage medium. The software functional units stored in a storage medium may include a plurality of instructions configured to instruct a computing device (which may be a personal computer, a server, or a network device, etc.) or a processor to execute some or all of the steps of the various embodiments of the disclosed method. The storage medium may include any suitable medium that can store program codes or instructions, such as at least one of a U disk (e.g., flash memory disk), a mobile hard disk, a read-only memory ("ROM"), a random access memory ("RAM"), a magnetic disk, or an optical disc.

A person having ordinary skill in the art can appreciate that for convenience and simplicity, the above descriptions described the division of the functioning units. In practical applications, the disclosed functions may be realized by various functioning units. For example, in some embodiments, the internal structure of a device may be divided into different functioning units to realize all or part of the above-described functions. The detailed operations and principles of the device are similar to those described above, which are not repeated.

The above embodiments are only examples of the present disclosure, and do not limit the scope of the present disclosure. Although the technical solutions of the present disclosure are explained with reference to the above-described various embodiments, a person having ordinary skills in the art can understand that the various embodiments of the technical solutions may be modified, or some or all of the technical features of the various embodiments may be equivalently replaced. Such modifications or replacement do not render the spirit of the technical solutions falling out of the scope of the various embodiments of the technical solutions of the present disclosure.

What is claimed is:

1. A method for controlling palm landing of an unmanned aerial vehicle ("UAV"), comprising:
   detecting a user and determining a distance between the user and the UAV based on first sensing data from a first sensor of the UAV;
   detecting a palm of the user based on second sensing data from a second sensor of the UAV different from the first sensor; and
   controlling the UAV to land on the palm of the user in response to determining that the user is detected, that the distance between the user and the UAV is less than or equal to a predetermined distance, that a flight status of the UAV is a hover state, and that the palm is located under the UAV.

2. The method of claim 1, wherein:
   the second sensor includes a distance sensor; and
   detecting the palm of the user based on the second sensing data from the second sensor of the UAV comprises:
      obtaining a distance measured by the distance sensor, the distance measured by the distance sensor being a distance of the UAV relative to a reference point under the UAV; and
      determining that the palm is located under the UAV based on the distance measured by the distance sensor.

3. The method of claim 2, wherein determining that the palm is located under the UAV based on the distance measured by the distance sensor comprises:
   determining that the palm is located under the UAV based on a change in the distance measured by the distance sensor.

4. The method of claim 1, wherein:
   the second sensor includes an image sensor; and
   detecting the palm of the user based on the second sensing data from the second sensor of the UAV comprises:
      obtaining image data of a location under the UAV acquired by the imaging sensor; and
      determining that the palm is located under the UAV based on the image data.

5. The method of claim 4, wherein determining that the palm is located under the UAV based on the image data comprises:
   determining that the palm is located under the UAV based on the image data and a change in a distance of the UAV relative to a reference point under the UAV.

6. The method of claim 1, further comprising:
   detecting the flight status of the UAV under a predetermined condition, including:
      detecting the flight status of the UAV in response to receiving a palm landing command transmitted by a control terminal.

7. The method of claim 1, further comprising:
   detecting the flight status of the UAV under a predetermined condition, including:
      detecting the flight status of the UAV in response to determining that the user is detected based on the first sensing data from the first sensor.

8. The method of claim 1, further comprising:
   detecting the flight status of the UAV under a predetermined condition, including:
      detecting the flight status of the UAV in response to determining that the user is detected based on the first sensing data from the first sensor, and in that the distance between the user and the UAV is smaller than or equal to the predetermined distance.

9. The method of claim 1, wherein the first sensing data comprise at least one of an RGB image or a depth image.

10. The method of claim 9, further comprising:
down-sampling the RGB image when the image data comprise the RGB image; and
determining detection of the user and/or determining the distance between the user and the UAV based on the down-sampled RGB image.

11. The method of claim 9, further comprising:
determining points within a predetermined range in a current frame of depth image when the image data comprise the depth image;
determining a connected region of the points within the predetermined range; and
determining detection of the user and/or determining the distance between the user and the UAV based on the connected region.

12. The method of claim 11, wherein determining the points within the predetermined range in the current frame of depth image comprises:
determining the points within the predetermined range in the current frame of depth image based on a previous frame of depth image.

13. The method of claim 11, wherein determining detection of the user based on the connected region comprises:
normalizing a shape characteristic of the connected region based on an average depth or a median depth of the connected region; and
determining detection of the user based on the normalized shape characteristic of the connected region.

14. The method of claim 13, wherein the shape characteristic of the connected region comprises at least one of a length, a width, or an area of the connected region.

15. The method of claim 11, wherein determining the distance between the user and the UAV comprises:
determining the distance between the user and the UAV based on an average depth or a median depth of the connected region in response to determining detection of the user.

16. The method of claim 1, wherein controlling the UAV to land on the palm of the user comprises:
determining a location of the palm; and
controlling the UAV to land on the palm based on the location of the palm.

17. The method of claim 16, wherein determining the location of the palm comprises:
determining the location of the palm based on third sensing data of a location under the UAV acquired by a third sensor, the third sensor including an imaging sensor.

18. The method of claim 1, wherein controlling the UAV to land on the palm of the user comprises:
determining a landing velocity based on a distance of the UAV relative to the palm; and
controlling the UAV to land on the palm of the user based on the landing velocity.

19. A device for controlling palm landing of an unmanned aerial vehicle ("UAV"), comprising:
a storage device configured to store program instructions; and
a processor configured to execute the program instructions stored in the storage device,
wherein when the program instructions are executed, the processor is configured to:
detect a user and determining a distance between the user and the UAV based on first sensing data from a first sensor of the UAV;
detect a palm of the user based on second sensing data from a second sensor of the UAV different from the first sensor; and
control the UAV to land on the palm of the user in response to determining that the user is detected, that the distance between the user and the UAV is less than or equal to a predetermined distance, that a flight status of the UAV is a hover state, and that the palm is located under the UAV.

20. The method of claim 1, wherein detecting the palm of the user includes:
in response to determining that the user is detected and that the distance between the user and the UAV is less than or equal to the predetermined distance, detecting the palm of the user based on the second sensing data from the second sensor of the UAV.

* * * * *